Jan. 18, 1966   S. H. KENDRICK   3,230,305
PROCESSES AND APPARATUS FOR THE AUTOMATIC INSPECTION
AND SEGREGATION OF ARTICLES
Filed Aug. 31, 1961   2 Sheets-Sheet 1
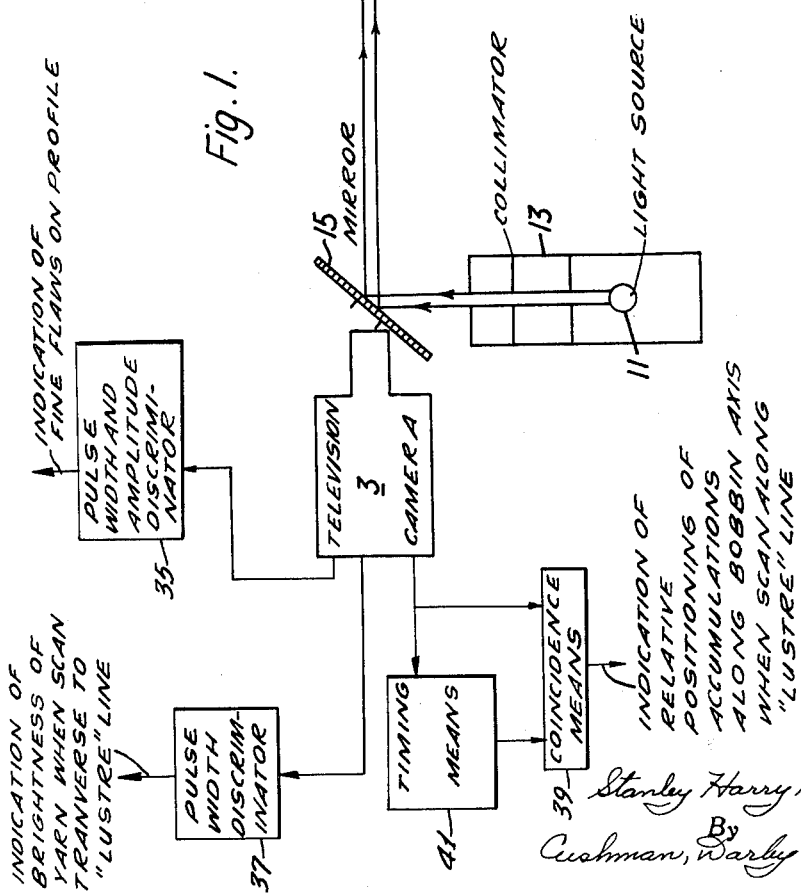
Inventor
Stanley Harry Kendrick
By
Cushman, Darby & Cushman
Attorneys Jan. 18, 1966     S. H. KENDRICK     3,230,305
PROCESSES AND APPARATUS FOR THE AUTOMATIC INSPECTION
AND SEGREGATION OF ARTICLES
Filed Aug. 31, 1961     2 Sheets-Sheet 2
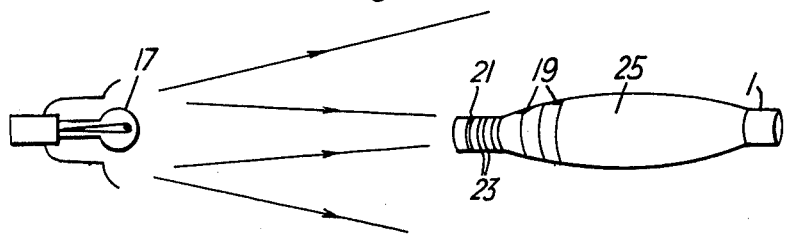
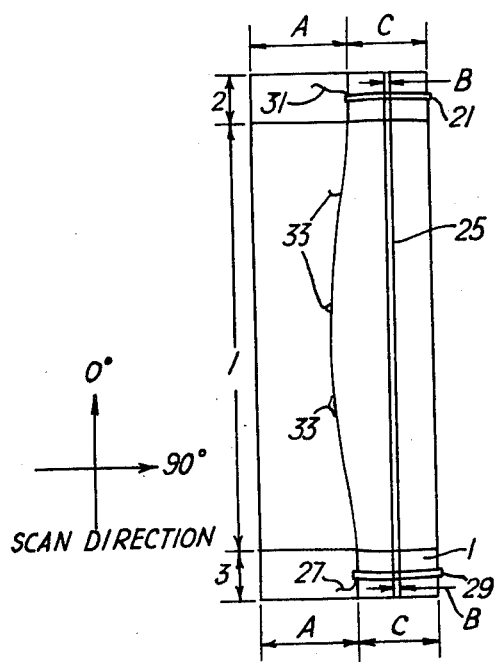
Inventor
Stanley Harry Kendrick
By
Cushman, Darby & Cushman
Attorneys United States Patent Office 3,230,305
Patented Jan. 18, 1966

3,230,305
PROCESSES AND APPARATUS FOR THE AUTOMATIC INSPECTION AND SEGREGATION OF ARTICLES
Stanley H. Kendrick, Caerleon, England, assignor to British Nylon Spinners Limited, Pontypool, England
Filed Aug. 31, 1961, Ser. No. 135,332
Claims priority, application Great Britain, Sept. 16, 1960, 31,931/60
11 Claims. (Cl. 178—6)

The present invention concerns improvements in or relating to processes and apparatus for the automatic inspection and segregation of articles.

One of the most time-consuming and variable of the tasks to be preformed on most industrial processes is that of inspection of the articles being produced to see if they are of the dimensions and/or quality required. The simpler aspects of such inspection have already been carried out by automatic means for segregating the correct from the incorrect articles; but in very many instances no adequate mechanical substitute for human inspection has been found, particularly when the defects to be observed are those which are related more to what may loosely be termed quality than to matters of size etc.

The invention will be described mainly with reference to the inspection and segregation of bobbins of yarn for faults such as broken projecting filaments, incorrect winding and oil stains; but it must be understood at the outset that the invention is equally applicable to any other article which is required to be inspected by "visual" means; or, in other words, where the outward appearance of the article is to be made the object of inspection for the purposes of segregation, and particularly where, as in the case of bobbins, the profiles of the articles are not of uniform nature, so that the scanning system employed must be able to work without dependence on the shape of the articles concerned.

I have alluded to the fact that human inspection is both time-consuming and variable, the latter particularly when the article concerned is close to the standard required, this variability being most apparent when a number of inspectors are involved. To overcome human fallibility and time-taking, it has previously been proposed to inspect articles by means of sundry scanning techniques, in one of which, for instance, a spot of light is caused to scan across the article and either the light reflected from the article or the light obscured by the article is detected or not detected by photoelectric cells, the output of which can be utilized for comparison with standard articles. The scanning spot of light is very conveniently produced by a cathode ray tube. Such a technique is useful, particularly for detecting gross abnormalities in the articles for inspection; but, as it is limited in its discriminating ability by the sensitiveness of the photo-electric cells to variations in the amount of light falling upon them, the technique is not wholly suitable as a substitute for human inspection for such faults as broken filaments projecting a very small way out from the surface of a bobbin of yarn, particularly when it is desired that the inspection shall also cope with far grosser details such as the positioning of the wound mass of yarn on the core of the bobbin.

I have now evolved a process, and apparatus, therefore, which process is relatively simple in function and construction and is capable of inspecting articles for both coarse and fine details with equal facility.

According to the invention, an article is inspected by an image converter, such as a television camera, preferably of the "high definition" (625 line) variety, and the electrical output of such converter (i.e. the video waveform) is fed to a circuit or circuits capable of detecting electrically any specific off-standard condition or conditions that can be detected by visual means, and the electrical output of the detecting circuit or circuits is employed to activate segregating or indicating mechanism. According to a further feature of the invention, the article to be inspected as aforesaid is illuminated by a specific source or sources of light. According to a still further feature of the invention, the electrical output of the detecting circuit, or circuits, is utilized to operate a relay, or relays, and thence mechanical means adapted to apply motion to the article under inspection, in order that segregation of the article may be effected according to whether it is standard or off-standard in respect of any, or any combination, of the conditions which the apparatus is adapted to inspect.

The detecting circuits may operate for instance, by pulse discrimination (i.e. by accepting only pulses of a given width and amplitude) or by comparison e.g. of adjacent lines of a frame scan, in either case so that the particular conditions may positively be selected for attention from amongst all the signals transmitted.

Where the article to be inspected is relatively large, like a bobbin of yarn, and a fault to be detected is relatively small, like a protruding broken filament of a yarn, it may be necessary to inspect the article with a plurality of cameras, each camera being positioned so as to inspect a part only of the article. Also, a sequence of cameras, each one utilized for the inspection and detection of given different conditions of the article, may be employed. Further, the article to be inspected may be so moved, as by rotation through 360° and/or bodily transference from one position to another on a turntable, that all parts of it are inspected in sequence by one or more cameras.

By means of the invention, and by switching-in any number of required pulse discriminator or comparator circuits concurrently or consecutively, the required switching being effected, for instance, by the standard synchronizing pulse which occurs at the start of each line of the camera scanning mechanism, it is possible with one camera to inspect the article, such as a bobbin, for any corresponding number of visual conditions, such as the nature of its profile, the relative positioning and size of respective parts of the article, such as the mass of yarn and the bunch for use as "transfer tail" wound upon a cylindrical bobbin, and the whiteness of the article, and this inspection is capable of being performed both more accurately and rapidly than by human visual inspection, and more comprehensively than by any other known optical and/or electrical inspection mechanism. As explained above, however, it may be desirable to spread the load of inspection between a number of cameras and; particularly is this the case where the lighting required for optimum inspection of the different conditions itself differs.

When the detecting circuits are of the pulse discriminating type, a "gate circuit," having the required characteristics for the particular condition to be detected, may be employed which will pass only those pulses on any given line of the video waveform which are of the width and amplitude corresponding to the condition concerned as shown at 35 in FIGURE 1 of the drawing.

When the detecting circuits are of the line comparison type, two different lines, say adjacent ones of the scan are selected by line selector units and fed to opposite sides of a comparator unit.

When the detecting circuit is required to compare the video signals with standard reference signals, the video wave-form of a given selected line, either with or without further pulse-shaping, is fed to one side of a coincidence circuit whilst the reference signals are fed to the other.

When more diffuse characteristics are to be detected, say as to overall variations in the surface properties of an object rather than as to a small irregularity thereof, it may be necessary to compare the video outputs of two or more cameras scanning the same object, with each camera adapted to receive light in a different part of the spectrum from the other or others. An out-of-balance signal will then indicate a preferential reception of light by one camera, and it is possible to arrange that such preferential reception will be of light of the character reflected from, say, a fault on the surface.

Particularly when automatic inspection according to the invention is being made to detect minute faults, such as a broken filament projecting from the profile of yarn wound on a bobbin, it is usually desirable to delay operation of any automatic rejection apparatus until after the fault in question has been "viewed" at least twice. Such delaying may be provided for by means of a "memory circuit" which is set into operation by the presence of a pulse, corresponding to the fault, on a line of the frame scan; and, if the same fault is detected in a pulse discriminating circuit, say, during the next scan, then the outputs of such "memory circuit" and pulse discriminating circuit, when fed to opposite sides of a coincidence circuit, will cause the latter to produce an electrical output which in turn is utilized to operate the indicating or rejection apparatus. The coincidence circuit will only operate if the fault is the same, that is to say if the amplitude and width of the pulse are the same as for the fault which set the "memory circuit" into operation and if the pulse occurs on the same line and at the same time as the latter.

Further detailed consideration will now be given to the particular application of the invention for the inspection and segregation of bobbins of yarn, e.g. nylon yarn. Inspection of such yarn may comprise the following: (a) broken filament projecting from the body of yarn wound on the bobbin; (b) knots on the surface of the yarn wound on the bobbin; (c) irregularity of the surface of the yarn wound on the bobbin, e.g. due to sloughing of coils; (d) the relative positioning axially along the bobbin of the main and auxiliary (e.g. bunch) windings of yarn; (e) the correctness of the lay of the coils connecting the bunch with the main windings; (f) the whiteness or lustre of the yarn wound on the bobbin.

It will be appreciated that some of these items can best be inspected by viewing the profile of the bobbin, and others by viewing the bobbin normally to its axis, and line scanning either along the length of the bobbin or transversely thereof. Equally, the manner of lighting of the bobbin, which, as in all applications of television, is of great importance, will depend on the item being tested, optimum conditions for one item not necessarily being optimum conditions for another.

Accordingly, if all the above items are to be covered in an inspection of each bobbin, it will be necessary to have lighting adapted to produce the best results for each item and to have the requisite number of television cameras for inspecting the bobbins in sequence in a manner such that the items concerned will be viewed to optimum effect.

Items (a), (b) and (c) above can be covered by one camera viewing the profile of a bobbin, the separate items being each identified with pulse discriminating circuits (plus delay circuits) of the appropriate different characteristics. For such profile viewing, optimum lighting is by means of a line light source on the side of the bobbin remote from the camera and masked therefrom by the bobbin, the line being parallel to the axis of the bobbin, such providing what is known as "dark ground" illumination. The camera is focussed on the "horizon" thus illuminated; and any projections from that "horizon" of the type to be detected, such as broken projecting filaments, will scatter or reflect the light picked up from the light source, and will induce a pulse of short duration on the video waveform of the appropriate line or lines. Dark ground illumination is a type of illumination generally known to those engaged in microscopic studies of opaque particles—for example, the examination of the Brownian movement of opaque particles can best be studied under a microscope by employing dark ground illumination, see A Text-Book of Light, by G. R. Noakes, published by MacMillan and Co., Limited, 1945, pp. 202–204.

Some irregularities in the surface of the yarn wound on the bobbin are better detected if the camera is focussed on the centre of the bobbin, with illumination provided from sources (or from reflecting mirrors) positioned in front and/or to the side of the bobbin so that the irregularities are emphasised by differences in the "lustre line" appearing along the surface of the bobbin or by the shadow cast from the side illumination. Such illumination is also preferable when items (d) and (e) above are to be catered for; in which cases, the camera is focussed on the centre line of the bobbin; and, when the direction of line scanning is axially of the bobbin, a line of the scan is automatically selected and held by a "sweep" and selector circuit, which line is one viewing within the "lustre line" which appears brightly along the surface of the bobbin and parallel to the axis. When the direction of scanning is transverse to the axis of the bobbin, e.g. at 90° thereto, lines may likewise be selected, for example for a direct measurement of the ½-peak width of lustre from the pulses resulting from the "lustre line" as shown at 37 in FIGURE 1 of the drawing. Referring to FIGURE 1, the video waveform, having a linear time scale, of a selected line is fed, directly, or after further pulse-shaping, to a coincidence circuit 39 and to a timing circuit 41, which timing circuit generates a train of pulses having time intervals corresponding for example to the physical positions at which yarn should be located on the bobbin and this train of pulses is compared with the video waveform in the coincidence circuit. In this case, if coincidence does not occur within the limits set by the timing circuit a reject signal will be passed to the rejection mechanism. The width of the reference pulses can be chosen with a view to allowing some tolerance in the relative positioning of the parts of the bobbin, such relative positioning including the spacing of the start of the main winding of yarn from one end of the bobbin, the spacing of the main winding from the bunch containing the transfer tail winding, and the spacing of said bunch from the other end of the bobbin.

Some surface irregularities such as a bruise in the surface of the wound yarn mass, are best detected by scanning the lustre line produced by front lighting when a bruise will show up as a strong negative pulse on a line scan axial to the bobbin. Oil stains and like, small area discolouration (as opposed to depressions) will be more difficult to detect, and may depend on the incorporation, say, of a fluorescent dye in the oil utilized in the textile processing machinery from which stains may inadvertently arise. Ultra violet light is then focussed on the lustre line region of the bobbin, and the green fluorescence of the oil will be contrasted with the blue fluorescence of, e.g., nylon yarn, such contrast being capable of being emphasized by the use of a green filter for the camera.

Whiteness or lustre of the yarn wound on a bobbin may be compared with standard whiteness or lustre, as the amplitude of the signal received on a given line of the scan is a function of the whiteness, or lustre, of the yarn viewed by that line, owing to the variations in reflected light intensity with whiteness or lustre, and depending on the angle of incidence of the light source as to whether the parameter being measured is either whiteness or lustre. More particularly, and as alluded to above, lustre may be measured or compared by a transverse scan of a portion of the lustre line produced by front lighting of the bobbin. Discoloured yarn may be detected by measuring the reflectivities in blue and yellow light, respectively.

Apart from the above conditions that can be detected according to the invention, it is also possible for the bobbins being inspected to be electronically identified according to the type of yarn, by means such as a number of thick and thin bands printed on paper surrounding one end of the bobbin which will give rise to corresponding signals, the number and arrangement of the respective bands being different for the different types of yarn. Equally, scan marks and dents in the core material of the bobbin may be detected: if illuminated axially a dent will reflect light brightly, as a facet; if illuminated frontally a score mark will lead to a reduction in light intensity on the lustre line.

In addition to activating segregating mechanism, the outputs of the various detecting circuits can be made to operate counters, from which statistical quality control information can be obtained.

The choice of scan direction will depend not only on the type of item to be inspected but also on the ability of the electronic circuits in use to pick-out pulses produced from the item in question. Having in mind that many bobbins have yarn surfaces which curve in the axial as well as radial planes, it is sometimes more easy to pick-out signals from a transverse scan than from an axial one, owing to the facts that, if the axial lustre line is being viewed being a line of very narrow width, then lines across it can be regarded as being approximately flat-based in contrast to the lines along its length which will be curved-based of the contour of the yarn package, and flat-based signals are much more readily contrasted than curved-based ones.

The invention will now be described with reference to the accompanying drawings which, by showing particular exemplary apparatus, may assist in the understanding of the invention.

In the drawings,

FIGURE 1 is a diagrammatic representation of the relative dispositions of apparatus according to the invention for viewing a bobbin illuminated both from the back and the front;

FIGURE 2 is a diagrammatic representation of the manner in which a bobbin may be illuminated from one side thereof; and FIGURE 3 shows the inspection regions, for both axial and transverse scanning into which the external surface of a bobbin may be divided.

In FIGURE 1, a horizontally disposed bobbin 1 is illuminated from the back, with respect to TV camera 3, by a 1,000 watt mercury arc low pressure lamp 5 housed within a collimator 7. Such back lighting provides what is known as "dark ground" illumination of the profile of the bobbin, so that small items such as projecting filaments 9 will reflect a large amount of light to camera 3. The bobbin is also illuminated from the front, again with respect to the camera, by a 400 watt mercury arc lamp 11 housed within a collimator 13, the beam of light being reflected, as shown, by the silvered mirror 15 which has a central hole therein adjacent to the camera lens. The illumination of the cylindrical surface of the front of the bobbin by the small source of light represented by the front lamp 11 produces a straight line of brightly (specularly) reflected light parallel to the axis of the bobbin, known as the "lustre line."

In FIGURE 2, horizontally-disposed bobbin 1 is illuminated from the side i.e. along its axis, by a 60-watt tungsten filament lamp 17. Such side, or axial, lighting emphasises varying package diameters, resulting from sloughing of coils of yarn, by the shadows 19 which they cause. The bunch winding 21, and the helical yarn windings 23 connecting the bunch with the main package build 25, are also emphasised with this type of lighting.

FIGURE 3 demonstrates the manner in which the surface area of a bobbin may be divided up for both axial line scanning and radial (transverse) line scanning, and several of the items to be inspected are diagrammatically represented. The bobbin 1 has yarn wound thereon in package 25 and in bunch 21. The last end of yarn 27 is secured to the bobbin by rubber band 29; and the first end of yarn 31 protrudes from bunch 21. If the yarn is a multi-filament yarn, it is possible that one or more of the filaments may be broken and protrude from the surface of the package; such are indicated at 33. For axial line scanning, the surface area of the bobbin may be divided into regions A, B and C, with region A being the one which is inspected for the presence of tails, ends and projecting filaments, region B incorporating the "lustre line" and being the one which is inspected for the relative positioning of the bunch, package and rubber band, the presence of helical windings connecting the bunch and the package, the whiteness of the yarn and the lustre of it, and region C being the one which is inspected for surface irregularities of bobbin and package as well as whiteness of the yarn and the presence of the helical windings connecting the bunch and the package. For radial (transverse) line scanning, the surface area of the bobbin may be divided into regions 1, 2 and 3, with region 1 being inspected for all items connected with the package 25, region 2 being inspected for items connected with the bunch 21 and region 3 being inspected for items connected with the end of yarn 27.

What I claim is:

1. In apparatus for electronically inspecting bobbins of yarn, the improvement comprising means for lighting one side of a bobbin of yarn, image converter means for electronically line scanning said side axially of the bobbin and providing video output signals including pulses representing yarn accumulations along the axis of the bobbin, timing means for generating a train of pulses having time intervals corresponding to the physical position at which yarn should be along said axis and coincidence means for determining if coincidence occurs within the limits set by said timing circuit to thereby determine the relative position of said yarn accumulations along said axis.

2. Apparatus as in claim 1 wherein said lighting means includes a source of ultra violet light for causing a detection by said processing means of surface discoloration caused by oil containing a fluorescent dye.

3. In apparatus for electronically inspecting bobbins of yarn, the improvement comprising image converter means for electronically optically scanning the profile of a bobbin of yarn and providing video output signals representing the results of the scan, means for dark ground illuminating a bobbin of yarn so that its profile is presented in silhouette to said image converter means, and means for electronically processing the video output signals of said image converter means to indicate off-standard conditions of said profile.

4. Apparatus for electronically inspecting elongated bobbins of yarn comprising means for lighting the profile of a bobbin of yarn from one side, means for lighting the other side of such bobbin including effecting a "lustre line" on the surface parallel to the axis of the bobbin, image converter means for electronically optically scanning the so lighted profile and other side to provide video output signals representing the scans, and means responsive to the said video output signals for determining off-standard conditions of said profile and other side.

5. Apparatus as in claim 4 wherein said image converter means line scans said bobbin axially.

6. Apparatus as in claim 4 wherein said image converter means line scans said bobbin transversely of the longitudinal axis of the bobbin.

7. Apparatus for electronically inspecting elongated bobbins of yarn comprising image converter means for electronically scanning optically a bobbin of yarn and providing video output signals representing the results of the scan, first means for so illuminating a bobbin of yarn that its profile is presented in silhouette to said image converter means, second means for so illuminating a bobbin of yarn that a "lustre line" is produced along its surface nearest said image converter means, and means for determining the geometrical positions of bobbin light variations by electronically processing the video output signals resulting from the scanning of the "lustre line" produced by said second illuminating means, said signals being processed with regard to their time base.

8. Apparatus as in claim 7 wherein said determining means compares the time position of pulses in the video output signal with the time position of reference pulses.

9. Apparatus as in claim 8 wherein said determining means includes means for generating a train of said reference pulses with time intervals representing predetermined characteristics of the bobbin of yarn being scanned, and means for comparing the coincidence of the reference and video pulses.

10. Apparatus for electronically inspecting bobbins of yarn comprising image converter means for electronically optically scanning a bobbin of yarn and providing video output signals representing the results of the scan, means for so illuminating the bobbin that a "lustre line" extends along its surface in a direction transverse to the scanning direction of said image converter means whereby the scan crosses the said lustre line, and means for measuring the one-half peak width of at least one video output pulse which results from the scan crossing the lustre line thereby directly measuring the lustre of said bobbin of yarn.

11. Apparatus as in claim 10 wherein said lustre line is substantially parallel to the longitudinal axis of the bobbin and the line scan of the image converter means is substantially perpendicular to that axis.

References Cited by the Examiner
UNITED STATES PATENTS

| | | | |
|---|---|---|---|
| 2,488,430 | 11/1949 | Offner | 250—219 |
| 2,648,723 | 8/1953 | Goldsmith | 178—6 |
| 2,798,605 | 7/1957 | Richards | 209—111.5 |
| 2,803,755 | 8/1957 | Milford | 250—230 |
| 2,806,401 | 9/1957 | Demuth | 209—111.5 |
| 3,049,588 | 8/1962 | Barnett | 178—6 |

S. J. GLASSMAN, *Primary Examiner.*

ROY LAKE, *Examiner.*

R. M. HESSIN, *Assistant Examiner.*